U. G. CASSADY.
DIMMING LENS FOR HEADLIGHTS.
APPLICATION FILED SEPT. 1, 1916.
1,230,670.
Patented June 19, 1917.
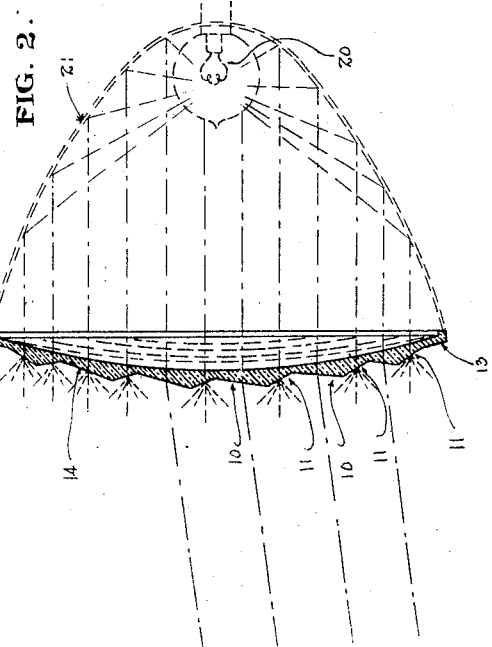
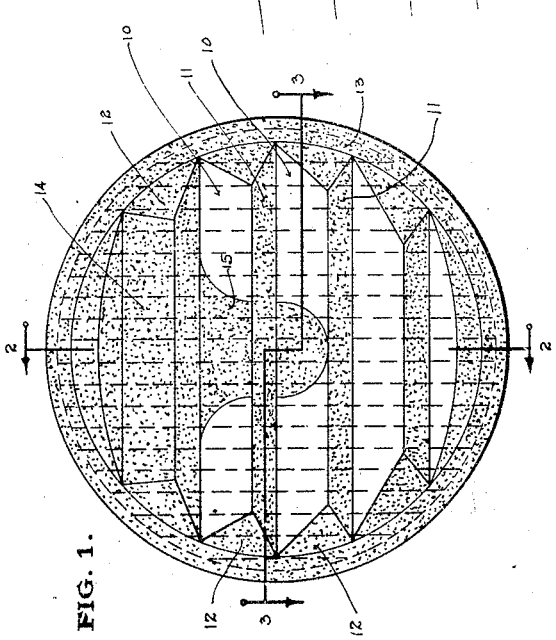
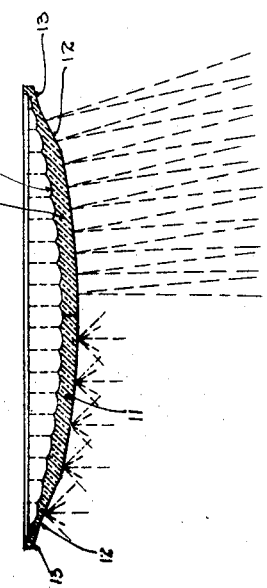
WITNESSES:
Louise Bennett
Josephine Gasper
INVENTOR
Ulysses G. Cassady
BY
Hood Schley.
ATTORNEYS

UNITED STATES PATENT OFFICE.

ULYSSES G. CASSADY, OF INDIANAPOLIS, INDIANA, ASSIGNOR TO PRIMOLITE CO., OF INDIANAPOLIS, INDIANA, A CORPORATION OF INDIANA.

DIMMING-LENS FOR HEADLIGHTS.

1,230,670.   Specification of Letters Patent.   Patented June 19, 1917.

Application filed September 1, 1916. Serial No. 117,983.

*To all whom it may concern:*

Be it known that I, ULYSSES G. CASSADY, a citizen of the United States, residing at Indianapolis, in the county of Marion and State of Indiana, have invented a new and useful Dimming-Lens for Headlights, of which the following is a specification.

It is the object of my invention to produce a diffusing and deflecting lamp glass or lens for automobile headlights, which will prevent the disagreeable and dangerous glare, will deflect a portion of the light slightly downward so as to light the road at a suitable distance ahead, will slightly diffuse this downwardly deflected portion of the light so that the light spot on the road ahead will be of suitable width to cover the full width of passage for the automobile and wider than the direct beam of light from the headlight, and will widely diffuse horizontally and vertically the remainder of the light so as to illuminate the sides of the road and the road itself directly in front of the automobile for some distance ahead.

The accompanying drawing illustrates my invention. Figure 1 is a front elevation of a lamp glass embodying my invention; Fig. 2 is a section on the line 2—2 of Fig. 1; and Fig. 3 is a section on the line 3—3 of Fig. 1.

The lamp glass consists primarily of a plurality of clear prismatic portions 10 having their front and rear faces relatively oblique and the thin edges of such portions upward, and a plurality of translucent portions 11, preferably formed as prisms having relatively oblique front and rear faces and having their thin edges downward, the prisms 10 and 11 both extending horizontally and preferably being interspersed. The translucency of the prisms 11 may conveniently be produced by grinding, etching, or other process, thereby forming a light-diffusing surface. At the horizontal ends of the prismatic portions 10 and 11 are beveled portions 12, which are also translucent, as by having light-diffusing faces. The portions 12 merge into an annular flange 13 by which the lamp glass is clamped in the lamp. The series of clear prismatic sections 10 does not extend entirely to the top, but instead at the top there is a rather wide light-diffusing portion 14 covering the whole upper segment of the glass. This light-diffusing portion 14, for the sake of symmetry of appearance, is in form a continuation of the series of prisms 10 and 11 having their thin edges alternately upward and downward, but has a light-diffusing surface throughout. There may also be a central light-diffusing portion 15 which extends downward from the light-diffusing portion 14 across the middle portions of the upper two clear prisms 10. The portions 14 and 15 are provided to prevent any directly forward and any upward undiffused rays from the headlight.

For convenience in manufacture, the lamp glass is made as one integral piece, conveniently slightly bulging so that as a whole it forms a section of a sphere. The inner or rear face of the lamp glass is preferably continuous across all the various sections 10, 11, 12, 14, and 15, and the prisms are formed by oblique surfaces on the front face of the lamp glass. The prismatic portions 10 and 11, when the lamp glass is made as a spherical segment as shown, are slightly curved horizontally, but this does not interfere with the prismatic effect on the light rays. The continuous rear face of the lamp glass is vertically fluted, as clear from Fig. 3. The cylindrical surfaces of these flutes 16 produce a dispersion of the light rays horizontally. The flutes may be either convex or concave, but I prefer to make them as concave grooves 16 extending vertically across the inner face of the lamp glass, because with concave flutes the foci of the dispersed light rays are virtual and not real. While I prefer to have the flutes 16 on the rear face and the oblique prism faces on the front face of the lamp glass, this is not essential, and either the flutes or the oblique faces may be on either or both sides of the lamp glass.

In operation, the light rays from the lamp 20 strike the reflector 21 and are sent forward as parallel rays, as indicated in Fig. 2. Of these parallel rays, some pass through the clear prisms 10 and others through the light-diffusing portions 11, 12, 14, and 15. The rays which pass through the clear prismatic portions 10 are deflected slightly downward, as clear from Fig. 2, because the thin edges of such portions 10 are upward. The flutes 16, which optically are cylinders superposed on the prisms, produce a slight dispersion of these downwardly deflected light rays, as clear from Fig. 3, so as to produce a light spot on the road ahead some distance in front of the automobile and of the desired width, preferably sufficient to light the full path of passage of the automobile. The rays which pass through the light-diffusing portions 11, 12, 14, and 15 are dispersed in all directions at the light-diffusing surfaces thereof, for each point of such surfaces when struck by a light ray becomes a new source of light from which light radiates in all directions forward of the plane of such surface, as clear from Figs. 2 and 3. The effect of the flutes 16 on the rays which pass through the light-diffusing portions, though actually the same as upon the rays of light passed through the clear portions, is in effect negligible because of the much greater dispersion which takes place on the passage of the rays through the light-diffusing portions. As a result, a portion of the parallel rays from the reflector 21 are deflected slightly downward and diffused horizontally to produce a light spot of the desired width on the road at the desired distance ahead, and the remainder of such parallel rays are diffused generally to produce a general illumination of the road ahead, upward, downward, and to the sides. The angle of this general illumination is greater than 180° both vertically and horizontally, because of the different angles of the light-diffusing surfaces of the portions 11, 12, 14, and 15.

I claim as my invention:

1. A lamp glass, having a clamp edge lying in a substantially vertical plane, and comprising a plurality of horizontally extending prismatic portions having superposed thereon a plurality of vertically extending cylindrical portions, in combination with a source of light behind such lamp glass, and a reflector associated with said source of light and said lamp glass for throwing a substantially parallel-ray beam upon said lamp glass.

2. A lamp glass, comprising a plurality of horizontally extending clear prismatic portions having relatively oblique front and rear faces and having their thin edges upward, and a plurality of light-diffusing portions interspersed with said clear portions, said light-diffusing portions being prismatic with relatively front and rear faces and their thin edges downward, and said clear prismatic portions having superposed thereon a plurality of vertically extending cylindrical portions.

3. A lamp glass, comprising a plurality of horizontally extending clear prismatic portions having relatively oblique front and rear faces and having their thin edges upward, and a plurality of light-diffusing portions interspersed with said clear portions, and said clear prismatic portions having superposed thereon a plurality of vertically extending cylindrical portions.

4. A lamp glass, comprising a plurality of horizontally extending clear prismatic portions having their front and rear faces at an oblique vertical angle to each other, said clear portions being thinner at the top, and a plurality of portions having light-diffusing surfaces, said clear portions being crossed by vertically extending concave flutes.

5. A lamp glass, comprising a plurality of horizontally extending clear prismatic portions having their front and rear faces at an oblique vertical angle to each other, said clear portions being thinner at the top, and a plurality of portions having light-diffusing surfaces, said clear portions being crossed by vertically extending flutes.

6. A lamp glass, comprising a plurality of horizontally extending clear prismatic portions having their front and rear faces at an oblique vertical angle to each other, said clear portions being thinner at the top, and a portion having a light-diffusing surface, said lamp glass being crossed by vertically extending concave flutes.

7. A lamp glass, comprising a plurality of horizontally extending clear prismatic portions having their front and rear faces at an oblique vertical angle to each other, said clear portions being thinner at the top, and a portion having a light-diffusing surface, said lamp glass being crossed by vertically extending flutes.

8. A lamp glass, comprising a plurality of clear portions having front and rear faces which are at an oblique vertical angle to each other with the thin edges of such portions upward and having one of such faces vertically fluted by concave flutes, and a plurality of light-diffusing portions at different angles so that a light diffusion of more than 180° is obtained.

9. A lamp glass, comprising a plurality of clear portions having front and rear faces which are at an oblique vertical angle to each other with the thin edges of such portions upward and having one of such faces vertically fluted by concave flutes.

10. A lamp glass, comprising a plurality of clear portions having front and rear faces which are at an oblique vertical angle to each other with the thin edges of such portions upward and having one of such faces vertically fluted, and a plurality of light-diffusing portions at different angles so that a light diffusion of more than 180° is obtained.

11. A lamp glass, having a clamp edge lying in a substantially vertical plane, and comprising a plurality of clear portions having front and rear faces which are at an oblique vertical angle to each other with the thin edges of such portions upward and having one of such faces vertically fluted.

12. A lamp glass, comprising a plurality of clear portions having front and rear faces which are at an oblique vertical angle to each other with the thin edges of such portions upward and having one of such faces vertically fluted, and a light-diffusing portion forming the upper segment of such glass and projecting down onto a clear portion at the horizontal middle of such glass.

13. A lamp glass, comprising a plurality of clear portions having front and rear faces which are at an oblique vertical angle to each other with the thin edges of such portions upward and having one of such faces vertically fluted, and a light-diffusing portion forming the upper segment of such glass.

14. A lamp glass, having a clamp edge lying in a substantially vertical plane, and having a plurality of horizontally extending ridges on one face with continuous valleys between them and a plurality of substantially parallel vertically extending ridges on the other, in combination with a source of light behind such lamp glass, and a reflector associated with said source of light and said lamp glass for throwing a substantially parallel-ray beam upon said lamp glass.

15. A dimming lens for headlights, comprising a disk one face of which is crossed by a series of prismatic ridges extending in one direction with continuous valleys between them and the other face by a plurality of substantially parallel flutes extending in a direction transverse to such ridges, in combination with a source of light behind such lamp glass, and a reflector associated with said source of light and said lamp glass for throwing a substantially parallel-ray beam upon said lamp glass.

16. A dimming lens for headlights, comprising a disk one face of which is crossed by a series of prismatic ridges extending in one direction with continuous valleys between them and the other face by a plurality of substantially parallel concave flutes extending in a direction transverse to such ridges, in combination with a source of light behind such lamp glass, and a reflector associated with said source of light and said lamp glass for throwing a substantially parallel-ray beam upon said lamp glass.

17. A dimming lens for headlights, comprising a disk one face of which is crossed by a series of prismatic ridges extending in one direction and the other face by a plurality of flutes extending in a direction transverse to such ridges, said prismatic ridges including a number which are similarly oblique to the general plane of the lens and are of clear glass and others which are provided with light-diffusing surfaces.

18. A dimming lens for headlights, comprising a disk one face of which is crossed by a series of prismatic ridges extending in one direction and the other face by a plurality of flutes extending in a direction transverse to such ridges, said prismatic ridges including a number which are similarly oblique to the general plane of the lens and are of clear glass.

In witness whereof, I have hereunto set my hand at Indianapolis, Indiana, this sixteenth day of August, A. D. one thousand nine hundred and sixteen.

ULYSSES G. CASSADY.